United States Patent [19]

Bleck et al.

[11] 4,077,767

[45] Mar. 7, 1978

[54] PROCESS FOR THE PREPARATION OF CONCENTRATED SOLUTIONS OF UREA COMPOUNDS

[75] Inventors: Wolf-Eckhard Bleck; Horst Nickel; Erich Krämer, all of Leverkusen, Germany

[73] Assignee: Bayer Aktiengesellschaft, Leverkusen, Germany

[21] Appl. No.: 621,799

[22] Filed: Oct. 14, 1975

[30] Foreign Application Priority Data

Oct. 16, 1974 Germany .............................. 2449206

[51] Int. Cl.$^2$ .................. C09B 67/00; D06P 1/645
[52] U.S. Cl. ............................................. 8/85 R; 8/7; 8/25; 8/39 R; 8/41 R; 8/54.2; 8/172 R
[58] Field of Search ................... 8/41 R, 85 R, 39 R, 8/172 R

[56] References Cited

U.S. PATENT DOCUMENTS

| 3,643,269 | 2/1972 | Schweizer | 8/41 |
|---|---|---|---|
| 3,701,624 | 10/1972 | Franklin | 8/7 |
| 3,898,033 | 8/1975 | McLeod | 8/26 |

FOREIGN PATENT DOCUMENTS

| 7,204,084 | 10/1972 | Netherlands. |
| 1,202,798 | 8/1970 | United Kingdom. |
| 1,202,799 | 8/1970 | United Kingdom. |
| 1,202,800 | 8/1970 | United Kingdom. |
| 1,331,142 | 9/1973 | United Kingdom. |

OTHER PUBLICATIONS

Morrison and Boyd, "Organic Chemistry" (Allyn and Bacon) 1960, p. 692.

Primary Examiner—A. Lionel Clingman
Attorney, Agent, or Firm—Plumley and Tyner

[57] ABSTRACT

The invention relates to the preparation of storage-stable, concentrated solutions of urea compounds of the formula $$F_1\text{—HN—CO—NH—}F_2$$

wherein $F_1$ and $F_2$ denote radicals of dyestuffs or dyestuff intermediates containing acid groups by reacting 2 equivalents of amines of the formula $$F_{1,2}\text{—NH}_2$$

with one equivalent of a compound of the formula $$Cl\text{—CO—X}$$

wherein X is chlorine or an aryloxy radical in the presence of alkaline earth metal ions in the pH range of 4.0 to 8.0, separating off the sparingly soluble alkaline earth metal salt of the resulting urea compounds, adding — for example — a salt of lithium of which the anion forms a salt, which is sparingly soluble in the reaction medium, with the alkaline earth metal cation of the urea compound to the suspension of these urea compounds and separating off the alkaline earth metal salt which has precipitated.

7 Claims, No Drawings

PROCESS FOR THE PREPARATION OF CONCENTRATED SOLUTIONS OF UREA COMPOUNDS

The present invention relates to a process for the preparation of storage-stable, concentrated aqueous or aqueous-organic solutions, of low electrolyte content, of urea compounds of the general formula $$F_1-HN-CO-NH-F_2 \qquad (I)$$

wherein $F_1$ and $F_2$ denote identical or different radicals of dyestuffs or dyestuff intermediates containing acid groups, and to their use.

The process is characterized in that 2 equivalents of amines or amine mixtures of the formula $$F_{1,2}-NH_2 \qquad (II)$$

wherein $F_1$ and $F_2$ have the abovementioned meaning are reacted, if appropriate stepwise, with one equivalent of a compound of the formula $$Cl-CO-X \qquad (III)$$

wherein X is chlorine or an aryloxy radical, preferably the phenoxy radical, in the presence of an amount of alkaline earth metal ions at least equivalent to the acid groups present in the radicals $F_{1,2}$, in the pH range of 4.0 to 8.0, preferably 6.5 to 7.5, the sparingly soluble alkaline earth metal salt of the resulting urea compounds of the formula I is separated off, a salt of lithium, of ammonia or of an organic base, of which the anion forms a salt, which is sparingly soluble in the reaction medium, with the alkaline earth metal cation of the urea compound, is added to the suspension of these urea compounds in water or water/solvent mixtures, or - in optional sequence, and separating off the alkaline earth metal salt which has precipitated.

In this way it proves possible to produce stable dyestuff solutions or solutions of dyestuff intermediates containing 10 to 60, preferably 20 to 50, percent by weight of these products.

The process according to the invention is particularly suitable for the preparation of concentrated solutions of those urea compounds of the formula I, wherein $F_1$ or $F_2$... for the radical of an anthraquinone or azo dyestuff which is substituted by at least one acid group, for example a carboxyl or sulphonamide group and preferably a sulphonic acid group.

Suitable dyestuffs of the formula I are the following dyestuffs characterised by the "Colour Index" numbers: 25,310, 25,315, 25,320, 25,340, 25,355, 25,380, 25,400, 29,000, 29,005, 29,010, 29,025, 29,030, 29,035, 29,045, 29,050, 29,055, 29,060, 29,065, 29,080, 29,085, 29,150, 29,155, 29,156, 29,160, 29,165, 29,166, 29,167, 29,170, 29,173, 29,175, 29,180, 29,190, 29,195, 29,200, 29,205, 29,210, 29,215 and 29,220.

Further suitable dyestuffs of the formula I are those described in U.S. Patent Specification No. 3,701,624 and British Patent Specification Nos. 1,202,799 and 1,331,142.

Dyestuff intermediates are to be understood as compounds, containing amine groups, which, for example after phosgenation and working up in accordance with the invention, give solutions which directly lead to the dyestuff solution, for example as a result of coupling or diazotisation and coupling.

Examples of such dyestuff intermediates containing amino groups are: 2-amino-5-hydroxy-naphthalene-7-sulphonic acid (I-acid), 2-amino-5-hydroxy-naphthalene-8-sulphonic acid, 2-amino-5-hydroxy-naphthalene-4,8-disulphonic acid, 2-amino-8-hydroxy-naphthalene-5- or -6-sulphonic acid, and 4-amino-1-phenyl-3-methyl- or -carboxylic acid-5-pyrazolone-2'- or -3'-sulphonic acid.

I-acid is particularly preferred. The I-acid-urea for example gives dyestuff solutions of the dyestuffs of which the "Colour Index" numbers may be found in the second group of the above list.

Suitable alkaline earth metal ions in the presence of which the phosgenation is carried out are magnesium, strontium, barium and above all calcium ions.

The pH can be set to the range required for the reaction with III by using basic alkaline earth metal compounds in a liquid or suspended form (for example hydroxides, carbonates and bicarbonates, calcium hydroxide suspension being preferred) or by other customary acid acceptors such as alkali metal carbonates, alkali metal hydroxides, alkali metal bicarbonates, amines and the like; in the last-mentioned case, the requisite alkaline earth metal ions are introduced into the phosgenation medium by adding neutral water-soluble alkaline earth metal salts, say the chlorides, bromides and nitrates.

The preferred reactant of the formula III is phosgene, which is employed virtually whenever solutions of symmetrical types of urea of the formula I or mixtures of such ureas are to be prepared. Only in the deliberate preparation of solutions of purely asymmetrical urea compounds is the use of the more expensive chloroformic acid aryl esters (X = O—aryl) necessary. This reaction, like the phosgenation, is furthermore known in principle (compare Houben-Weyl, Methoden der Organischen Chemie (Methods of Organic Chemistry), volume VIII/3, page 162).

The asymmetrical types (I) are prepared stepwise by first reacting 1 mol of an amine of the formula $F_1-NH_2$ with 1 mol of chloroformic acid aryl ester to give compounds of the formula $$F_1-NH-CO-O-Aryl \qquad IV$$

and converting these - if appropriate after intermediate isolation - with a further mol of an amine $F_2-NH_2$ into the corresponding urea derivative of the formula I.

The reaction temperatures for the reaction with (III) are between 0° and 80° C, preferably 25° – 70°. The precipitation of the urea compounds can at times be assisted by "salting-out" by means of neutral alkaline earth metal salt solutions, for example $CaCl_2$ solutions.

Suitable solvents in which the precipitated alkaline earth metal salt of the urea compound (I) can be suspended, mixed with water, are water-miscible organic solvents, such as alcohols, alcohol-ethers, carboxylic acid amides, ureas, sulphoxides and many others.

Preferably, however, the reaction is carried out in a purely aqueous medium.

Suitable basic lithium compounds which are employed according to the invention are the hydroxide, carbonate and bicarbonate.

Suitable acids for precipitating the alkaline earth metal ions are carbonic acid, phosphoric acid, oxalic acid, citric acid, tartaric acid and above all sulphuric acid.

The salts of lithium, of ammonia and of the organic bases, which can be added to the suspensions of the alkaline earth metal salts of the urea compounds, are also derived from the abovementioned acids.

Suitable organic bases are above all amines, preferably those which form readily water-soluble salts with the urea compounds I, and which are described, for example, in DOS (German Published Specification) No. 2,021,520 (British Pat. No. 1,311,836) or in DOS (German Published Specification) No. 2,152,523 (French Patent Specification No. 2,111,628). Examples which may be mentioned are: ethanolamine, diethanolamine, triethanolamine, tris-[2-(2-hydroxyethoxy)-ethyl]-amine, mono- di- and tris-propanolamine or -isopropanolamine, 2-amino-1,3-propanediol, 2-amino-2-methylol-1,3-propanediol, 2-amino-2-ethyl-1,3-propanediol, D-glycamine, D-glucosamine, tetra-[2-(2-hydroxy-ethoxy)-ethyl]-ammonium hydroxide, ethylenediamine, dimethylethanolamine or diethylethanolamine, β-amino-β'-hydroxy-diethyl ether, morpholine, piperidine and N-hydroxyethylpiperidine or mixtures thereof.

As already mentioned, the treatment of the suspensions of the precipitated alkaline earth metal salts of the urea compounds (I) with the stated agents, in aqueous or aqueous-organic media, can be carried out in optional sequence.

For example, it is possible first to add the acid which precipitates the alkaline earth metal ions to the suspension of the alkaline earth metal salt of the urea compound (I), and then to add the basic lithium compound, ammonia, or an organic base, or vice versa. Furthermore it is possible to add soluble salts of lithium, of ammonia or of the organic base and one of the "precipitation acids" mentioned to the urea suspension.

Preferably, however, such salt solutions are first taken and the press cake of the alkaline earth metal salt of the urea compound (I), whilst still moist, is stirred into this solution, if appropriate at an elevated temperature (for example at from 70° C to the boiling point of the solution).

Where, however, the reaction of the urea salt is carried out first with free strongly basic amine, it is advisable to choose, in the case of sensitive dyestuffs, a reaction temperature which is not too high, preferably 0° – 25° C.

As also already explained above, the amount of the agents which act on the urea salts must be so chosen that at least 1 equivalent of lithium, ammonia or organic bases employed per acid radical in the urea compounds (I), and at least one equivalent of "precipitation acid" is employed per alkaline earth metal cation of the urea.

An excess of up to 10% of the agents mentioned can however at times be tolerated and is in some cases even of advantage.

The precipitated alkaline earth metal salts are separated from the concentrated dyestuff solution by customary methods of separation, preferably by filtration.

In carrying out the process according to the invention in practice, the procedure followed is that phosgene is passed into an aqueous solution, for example a calcium salt solution, of an amine of the formula II, preferably in the presence of calcium hydroxide, at 25° – 70° C, until amine of the formula II is no longer detectable in a sample which is taken. The pH value of the reaction solution has at the same time dropped from an initial value of 11 to about 7 and is kept at pH = 6.5 – 7.5, by addition of calcium hydroxide suspension, until the phosgenation has ended. The calcium salt of the urea compound (I), which has precipitated, is then filtered off and the moist filter cake or the dry dyestuff powder is introduced into an aqueous solution of, for example, lithium sulphate or ammonium sulphate, and the mixture is warmed is appropriate.

After the exchange reaction has ended, the calcium sulphate which has precipitated is filtered off. The filtrate obtained can be employed directly for the particular use process.

If desired, the filtrate which has been isolated in accordance with the process of the invention and contains the urea compounds I can be concentrated.

The concentrated solutions of dyestuff intermediates, obtained in accordance with the new process, can be converted directly, in a simple manner, to concentrated dyestuff solutions by customary methods of further processing (diazotisation, coupling, condensing and the like).

The solutions of dyestuffs obtained in accordance with the process of the invention, either directly or from the intermediates, are outstandingly suitable for dyeing natural or synthetic fibre materials, especially materials of synthetic high molecular weight polyamides, silk, leather, cellulose or cotton, and preferably paper.

The examples which follow illustrate the invention without restricting it thereto. In the examples parts, unless stated otherwise, denote parts by weight, percentages denote percentages by weight, and the temperatures are given in degrees centigrade.

EXAMPLE 1

421 parts of 3-(4'-amino-2'-tolylazo)-naphthalene-1,5-disulphonic acid (as an approx 45% strength press cake in the form of the free acid) are dissolved, with 50 parts of technical-grade calcium hydroxide, in 3,000 parts of water in a reaction vessel, whilst stirring. Phosgene is now passed into the reaction mixture at a temperature of 30° – 45° and the pH value of the mixture is kept at 5 to 6, by simultaneous addition of calcium hydroxide suspension, until the reaction has ended. During the reaction, the sparingly soluble calcium salt of the dyestuff formed separates out. After completion of the reaction, the dyestuff salt is isolated by filtration. The filter residue obtained is added, whilst stirring, to a solution of 6,000 parts of water, 112 parts of sulphuric acid of 60° Be strength and 190 parts of diethanolamine. The calcium is precipitated as calcium sulphate and the dyestuff-sulphonic acid employed goes into solution as the diethanolammonium salt. The calcium sulphate is filtered off, the residue is rinsed with 130 parts of water, and a 50% strength solution of the diethanolammonium salt is obtained; this solution can, as desired, be diluted with water or be concentrated by distilling off a part of the water. The solution thus prepared gives yellow paper dyeings in accordance with the customary dyeing methods. Equally, cotton is dyed in deep yellow shades (dyestuff C.I. 29,025).

If instead of diethanolamine the equivalent amount of tris-[2-(2-hydroxy-ethoxy)-ethyl]-amine, triethanolamine or monoethanolamine is used, concentrated, stable dyestuff solutions are again obtained.

If instead of 3-(4'-amino-2-tolylazo)-naphthalene-1,5-disulphonic acid the equivalent amount of 3-(4'-amino-3'-methoxybenzeneazo)-naphthalene-1,5-disulphonic acid or 3-(4'-amino-3'-methoxy-6'-methylbenzeneazo)-naphthalene-1,5-disulphonic acid, 7-(4'-amino-2'- methylbenzeneazo)-naphthalene-1,3-disulphonic acid or 7-(4'-amino-3'-methoxy-benzeneazo- or -3'-methoxy-6'-methylbenzeazo)-napthalene-1,3-disulphonic acid are employed, concentrated stable dyestuff solutions are again obtained.

EXAMPLE 2

90.2 parts of 4-amino-5-methoxy-2-tolylazo-naphthalene-3,7-disulphonic acid are phosgenated, as described in Example 1, in the presence of calcium hydroxide suspension at pH = 7.5. After completion of the reaction, the sparingly soluble calcium salt of the dyestuff is isolated by filtration. The press cake obtained is added, whilst stirring, to a solution of 65 parts of water, 62 parts of sulphuric acid of 60° Be strength and 105 parts of a 1:1 mixture of monoisopropanolamine and diisopropanolamine. On stirring, calcium sulphate — which is sparingly soluble — forms and the dyestuff dissolves as the amine salt. The calcium sulphate is filtered off, the residue is washed with 20 parts of water and a 37% strength solution of the monoisopropanolammonium salt or diisopropanolammonium salt is obtained.

If instead of mono-isopropanolamine or di-isopropanolamine, the equivalent amount of diethanolamine or tris-[2-(2-hydroxy-ethoxy)-ethyl]-amine is used in the above example, storage-stable dyestuff solutions are again obtained.

EXAMPLE 3

61.4 parts (0.2 mol) of 4-amino-3-methoxy-azobenzene-3'-sulphonic acid (as an approx. 40% strength moist press cake, and in the form of the free acid) are suspended in 700 parts of water and 40 parts of calcium hydroxide. Phosgene is passed into the suspension at 50° to 70° C and the pH value is kept at about 6 with calcium hydroxide suspension. After completion of the phosgenation, the calcium salt of the dyestuff, which has precipitated, is isolated at about 50° C. The press cake (250 parts) is introduced, whilst stirring, into a solution of 54.4 parts of sulphuric acid of 60° Be strength and 280 parts of tris-[2-(2-hydroxyethoxy)-ethyl]-amine. After two dyestuff has dissolved, the calcium sulphate which has precipitated is filtered off. The residue can optionally be rinsed with water. A 30% strength solution of the tris-[2-(2-hydroxy-ethoxy)-ethyl]-ammonium salt is obtained.

If, in the above example, a mixture of 4-amino-3-methoxy-azobenzene-3'-sulphonic acid and 4-amino-3-methoxy-4'-methylazobenzene-3-sulphonic acid is used in place of 4-amino-3-methoxy-azobenzene-3'-sulphonic acid, a 35% strength dyestuff solution with respect to the tris-[2-(hydroxy-ethoxy)-ethyl]-ammonium salt with the abovementioned amine is obtained.

We claim:

1. In a process for preparing a concentrated aqueous or aqueous/organic solution of low electrolyte content containing 10–60% by weight of an urea compound of the formula $$F_1-NH-CO-NH-F_2$$

wherein $F_1$ and $F_2$ are identical or different radicals of dyestuffs or dyestuff intermediates containing acid groups, by reaction of an equivalent of each of two amines of the formulas $$F_1-NH_2 \text{ and } F_2-NH_2$$

with one equivalent of $$Cl-CO-X$$

wherein X is chlorine or aryloxy; the improvement which comprises:
(1) conducting the reaction of a pH at 4.0–8.0 in the presence of an amount of alkaline earth metal ions equivalent to the acid groups present in $F_1$ and $F_2$;
(2) removing the sparingly soluble alkaline earth metal salt of said urea compound;
(3) suspending said alkaline earth metal salt of said urea compound in water or a mixture of water and a water miscible organic solvent;
(4) adding to the resulting suspension
(a) a salt of lithium, an ammonium salt, or a salt of an organic base wherein the amount of such salt and said alkaline earth metal ions are capable of forming an second alkaline earth metal salt which is not more than sparingly soluble in the liquid medium of said suspension, or
(b) equivalent amounts of the appropriate acid and base to form in situ said salt of lithium, said ammonium salt, or said salt or an organic base;
(5) removing said second alkaline earth metal salt as a precipitate; and
(6) recovering a solution containing a low electrolyte concentration and 10%–10% by weight of said urea compound.

2. Process of claim 1, wherein said alkaline earth metal is calcium.

3. Process of claim 1, wherein said acid is sulfuric acid.

4. Process of claim 1, wherein said reaction is carried out in the absence of an organic solvent and said suspension liquid is water.

5. Process of claim 1, wherein $F_1-NH_2$ and $F_2-NH_2$ are aminomonoazo dyestuffs.

6. Concentrated solutions obtained by the process of claim 1.

7. Concentrated solutions of claim 6 containing 20–50% by weight of said urea compound.